United States [11] 3,610,797

| [72] | Inventor | William C. Loening |
| | | Binghamton, N.Y. |
| [21] | Appl. No. | 757,624 |
| [22] | Filed | Sept. 5, 1968 |
| [45] | Patented | Oct. 5, 1971 |
| [73] | Assignee | General Precision, Inc. |
| | | Binghamton, N.Y. |

[54] METHOD AND APPARATUS FOR CONTROLLING THE POSITION OF TWO ELEMENTS HAVING A DISCONTINUITY IN THEIR POSITIONAL RELATIONSHIP
9 Claims, 6 Drawing Figs.

[52] U.S. Cl............................................... 35/10.2,
 35/12, 235/151, 328/151, 350/181
[51] Int. Cl............................................... G09b 9/08,
 G06g 7/66
[50] Field of Search........................................ 35/10.2;
 32/12; 350/181; 328/151; 307/235; 318/596, 604,
 605, 611, 636; 235/151

[56] References Cited
UNITED STATES PATENTS

| 3,039,206 | 6/1962 | Wilson | 35/12 |
| 3,101,645 | 8/1963 | Hemstreet | 350/181 X |
| 3,119,984 | 1/1964 | Brandt et al. | 328/151 X |
| 3,169,233 | 2/1965 | Schwartz | 307/235 |
| 3,258,699 | 6/1966 | Harenberg | 328/151 |
| 3,401,228 | 9/1968 | Barnes | 35/10.2 |

Primary Examiner—Malcolm A. Morrison
Assistant Examiner—Felix D. Gruber
Attorneys—Francis L. Masselle, William Grobman and Charles S. McGuire ABSTRACT: The disclosed embodiment of the present invention is a computer for controlling the rotational position of a pair of anamorphic lenses in a perspective alteration optical system for a simulator. At a particular position of one anamorphic lens in such an optical system, the position of the other anamorphic lens is undefined and computed rates exceed the hardware capabilites. A level detector senses the signal supplied to the drive for the first anamorphic lens and supplies an output when that signal is within a prescribed range of the point at which the position of the second lens is undefined. The signal for driving the second anamorphic lens is connected through a switch and a sample and hold circuit to the drive for the second lens. The switch is responsive to the output of the level detector. The output of the level detector is also operative to disconnect the computed signal supplied to the drive of the first anamorphic lens and to connect a constant level signal to such drive to maintain the relative positions of the lenses fixed.

WILLIAM C. EBELING
INVENTOR.

BY *Andrew G. Villon*

HIS ATTORNEY

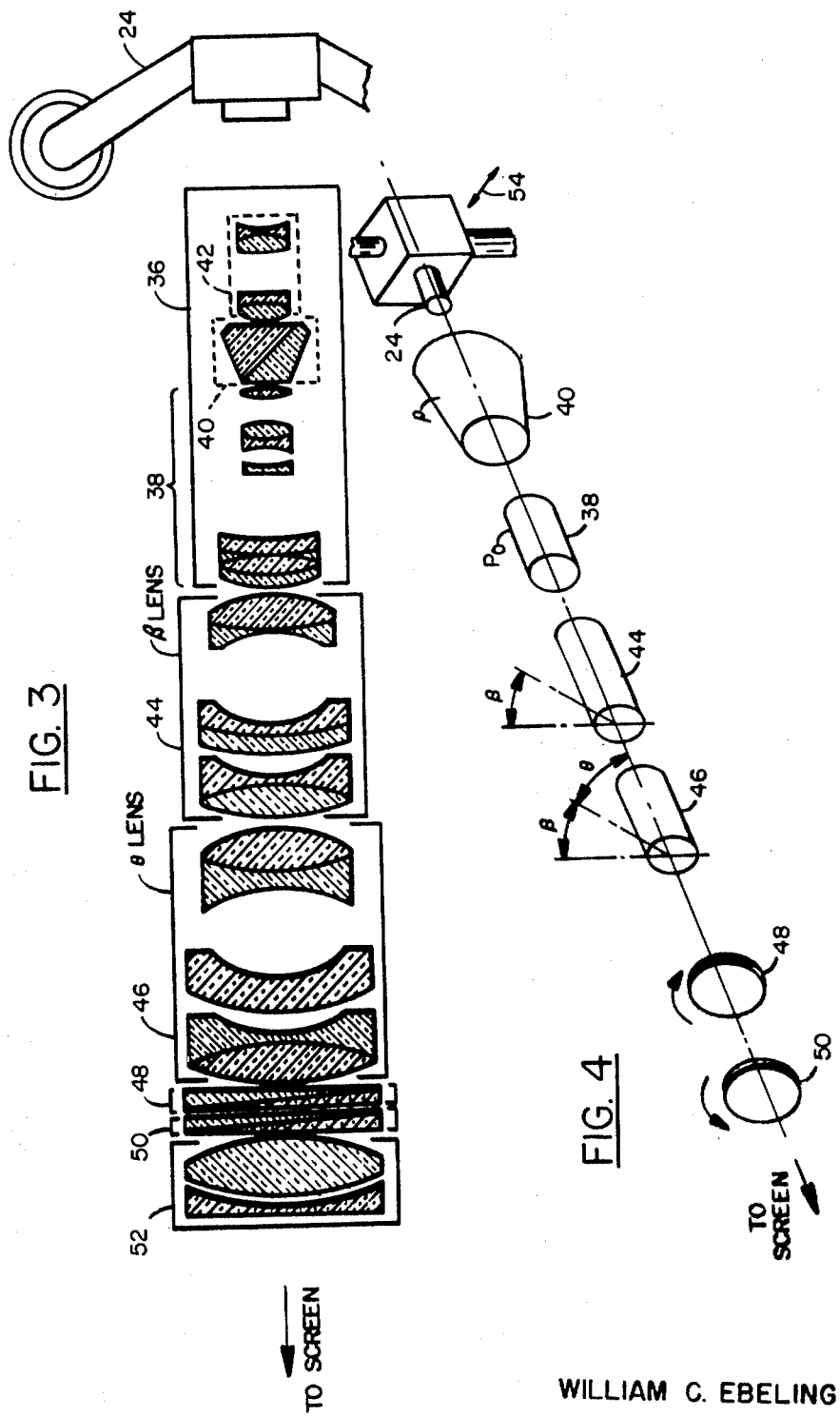

WILLIAM C. EBELING
INVENTOR.

BY Andrew M. Pullen
HIS ATTORNEY

WILLIAM G. EBELING
INVENTOR.

HIS ATTORNEY

METHOD AND APPARATUS FOR CONTROLLING THE POSITION OF TWO ELEMENTS HAVING A DISCONTINUITY IN THEIR POSITIONAL RELATIONSHIP

This invention relates generally to a visual system computer and more particularly to a logic circuit controlling the rotational positions of a pair of anamorphic lenses in a perspective alteration optical system. The present invention has particular application in perspective alteration optical systems which employ a pair of anamorphic lenses for performing two primitive transformations of an image.

In a particular type of optical system for altering the apparent perspective of an image, a pair of anamorphic lenses are employed, the magnification axes of which must be rotationally positioned in accordance with a predetermined relationship, wherein the rotational position of one of the lenses is defined in accordance with that relationship and with respect to the rotational position of the other lens. Such an optical system is described in U.S. Pat. No. 3,015,988. In order to position the anamorphic lenses of such a system, a pair of servomechanisms and a differential coupling may be employed. One of the lenses is connected in tandem with an output of one of the servomechanisms and an input shaft of the differential coupling. The second servomechanism is connected to a second input shaft of the differential coupling. The second lens elements is connected to an output of the differential coupling, such that its position can be determined from the position of the first lens which is connected to a first input of the differential coupling, as well as the position of the second input of the differential coupling.

In the type of image alteration optical system described in U.S. Pat. No. 3,015,988, a point exists in the family of curves defining the position of the two anamorphic lenses at which the position of one of the anamorphic lenses is undefined with respect to a reference. This point occurs at a position of the anamorphic lenses wherein the axis of magnification of the lenses are orthogonal to one another. When the axis of magnification of two anamorphic lenses each having the same power of magnification are orthogonalate one another the combination is the equivalent of a spherical lens with respect to the light passing therethrough. Consequently, when the axis of magnification of two anamorphic lenses are orthogonally disposed with respect to one another, the simultaneous rotation of both lenses, while maintaining the orthogonal relationship of the magnification axes, will not alter or distort an image which is being transmitted therethrough.

In an optical system which employs anamorphic lenses for altering the apparent perspective of an image, it may be necessary to view the image without any distortion. Since the combination of a pair of anamorphic lenses having their magnification axes orthogonal to one another is the equivalent of a spherical lens, this relative position of one lens with respect to the other lens must be maintained constant, if no distortion is desired. It can be appreciated, therefore, that an equal rotational displacement of both lenses with respect to the same reference will not distort the image. Consequently, if the angular position of one lens is defined with respect to the angular position of the other lens, the angular position of both lenses will be undefined with respect to a reference when the magnification axis of the two lenses are orthogonal to one another i.e., as long as the angular position of the one lens with respect to the other is maintained at 90° both lenses mat be rotated to any angular position with respects to a fixed reference and still have the same optical effect.

If such an optical system is employed as a visual system of a simulated vehicle or the like, a motion picture film is employed which includes a plurality of scenes photographed along a typical vehicular path of the simulated vehicle. An optical system for altering the apparent perspective of the images of those scenes is employed for simulating a departure from the vehicular path described by the scenes recorded on the motion picture film. The optical system for altering the apparent perspective of the images of those scenes is controlled from various computed quantities derived from the controls which are operated by the student using the simulated vehicle. If the student operates the controls of the simulated vehicle such that the simulated vehicle follows the identical path which was followed by the vehicle carrying the camera which photographed the motion picture film, the two anamorphic lenses of that optical system for displaying the scenes to the student will not produce any distortion of the resultant image. As mentioned hereinabove, the position of both of the anamorphic lenses is undefined with respect to a reference when no distortion is produced in the image by the optical system.

Since the optical system is controlled in accordance with a plurality of computed quantities which are generated in accordance with the controls of the simulated vehicle, a plurality of signals, one for each lens must be developed which is indicative of the position of each of the anamorphic lenses. However, if the position of one of the anamorphic lenses is undefined, the computed quantity in the form of a control signal can be any value within a prescribed range if the position of that lens is undefined. Under such conditions, extremely high accelerations may be produced in the angular displacement of the anamorphic lens. If the angular position of the other anamorphic is defined with respect to the angular position of the first anamorphic lens, the above-described differential coupling and associated servomechanisms may be employed for controlling the position of both lenses. However, not only will the computed rates exceed the hardware capabilities, but high accelerations which may be developed in the motion of the first anamorphic lens will cause an error in the position of the second anamorphic lens due to the inherent compliance or the "figure of merit" of the servomechanism.

If the simulated vehicle is being operated in a manner which requires visual simulation of a particular scene as viewed from a point which is spaced from the viewpoint of the recorded scene and an excursion is made through the viewpoint of the recorded scene to another viewpoint, extremely high accelerations may be required of the anamorphic lens whose position is undefined with respect to a reference at the point where the image is undistorted, which is the viewpoint of the recorded scene. For instance, if the scene is to be viewed from a point to the left of the viewpoint of the recorded scene and an excursion is made directly toward the viewpoint of the recorded scene and an abrupt change is made at such viewpoint in the excursion, the rotational position of the anamorphic lens, which position is undefined when the viewpoint of the simulated scene is at the viewpoint of the recorded scene, will require a large change while the visual excursion passes through that viewpoint. Consequently, large accelerations of that lens will be required which will result in an error in the position of the other anamorphic lens due to the inherent compliance in the servomechanism associated therewith. This error will introduce unwanted distortions in the image which will reduce the realism of the display.

Accordingly, it is an object of the present invention to maintain the positions of a pair of anamorphic lenses employed in a perspective alteration optical system fixed relative to one another when the position of both lenses with respect to a fixed reference is undefined.

Another object of the present invention is to eliminate undesired distortions in the display from an anamorphic visual system for a simulator resulting from a condition of having the computed drive quantities exceeding the hardware capabilities.

Still another object of the present invention is to eliminate the drive quantity from the drive system for one of the anamorphic lenses, which quantity requires high accelerations thereof.

These and other objects of the present invention are specifically obtained by the provision of a level detector for sensing the drive quantity supplied to the drive system for one of the anamorphic lenses, a sampling and holding circuit for storing the quantity corresponding to the desired position of the other anamorphic lens, which sampling circuit is connected to the drive for the other anamorphic means, and a switch for disconnecting the quantity from the sampling circuit in response to an output from the level detector.

These and other objects, features and advantages of the present invention will be more fully realized and understood from the following detailed description when taken in conjunction with the accompanying drawings wherein:

FIG. 3 is a diagrammatic illustration of the optical system employed in the visual system illustrated in FIG. 2;

FIG. 4 is a diagrammatic illustration of the optical system illustrated in FIG. 3 showing the various functions and relationships of the elements therein;

Like reference numerals throughout the various views of the drawings are intended to designate the same or similar structures.

Figure 1:
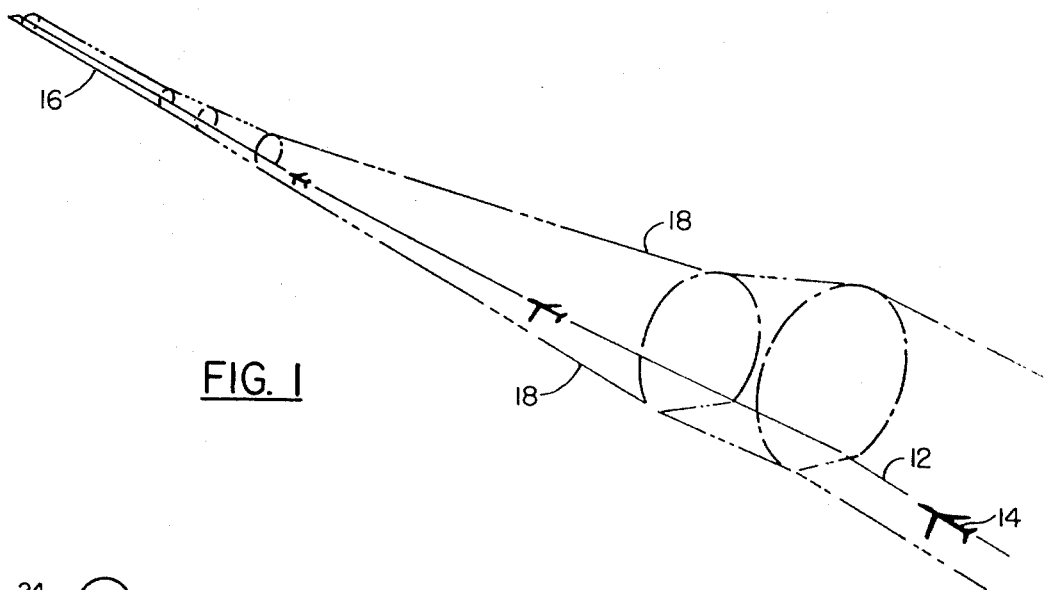
FIG. 1 is a diagrammatic view of the flightpath of a camera airplane and the associated envelope defining the maximum excursions of a visual system in a simulated airplane which simulates the same flight.

With reference to FIG. 1, there is shown a flightpath 12 of an airplane 14 making an approach to a landing strip 16. If it is desired to visually simulate the approach of the airplane 14 with respect to the landing strip 16, a motion picture camera (not shown) is mounted on the airplane 14 and a plurality of scenes are recorded approximately at the rate of 24 frames per second. The developed motion picture film is then employed with a grounded airplane simulator, such as the type illustrated in FIG. 2, to provide a motion picture presentation of scenes as viewed from the airplane 14 proceeding along the flightpath 12. However, since a student pilot cannot effectively follow the identical flightpath 12, the visual system for displaying the motion picture presentation must be capable of distorting the image to simulate excursions from the flightpath 12.

The optical system for altering the apparent perspective of an image, which is described in U.S. Pat. No. 3,015,988, permits shifting the apparent viewpoint of the simulated aircraft from the flightpath 12 to the limits shown by the phantom lines designated with the reference numeral 18. The lines 18, therefore, define the envelope of the perspective alteration capabilities of the optical system employed in conjunction with the motion picture projector on the aircraft simulator.

Figure 2:
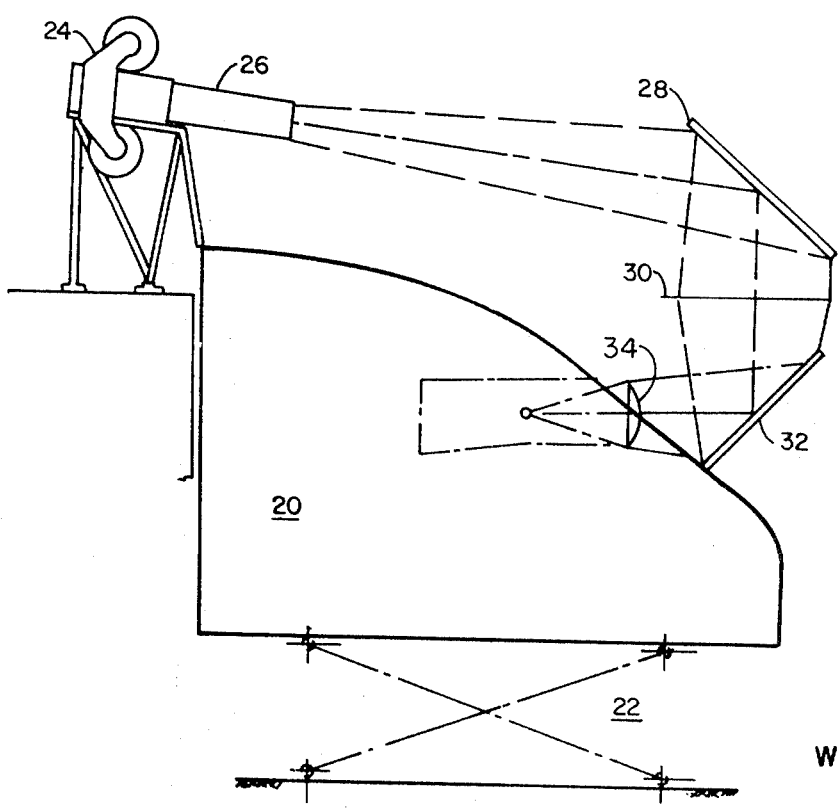
FIG. 2 is a side elevational and a diagrammatic view of a simulator with the associated visual system mounted thereon.

Such an aircraft simulator is illustrated in FIG. 2 as including a cockpit 20 which is mounted on a motion system generally designated with the reference numeral 22. A projector 24 displays the scenes recorded on the film which were photographed from the airplane 14 following the flightpath 12. An optical system 26 provides the necessary alteration in the apparent perspective of the image in accordance with controls operated by the student pilot from within the cockpit 20. The projected image is displayed to the student pilot by means of a mirror 28, a rear projection screen 30, a mirror 32, and a lens 34.

The optical system 26 for altering the apparent perspective of the image of the scenes recorded on the film is illustrated in FIG. 3. As shown therein, the optical system 26 includes a first group of optical elements or lenses designated with the reference numeral 36 which form an image rotator and zoom lens combination. A group of lenses designated with the reference numeral 38 form a variable magnification, variable focal length or zoom lens combination for varying the size of the projected image. A Pechan prism 40 is disposed in front of the zoom lens 38 and permits rotation of the image. A fine focus for the system is provided by a group of lenses 42.

Immediately following the first section 36 is a group of lenses 44 which form an anamorphic lens group. Each of the lenses within the group 44 are fixed relative to one another and the entire group is mounted for rotation about the optical axis thereof. Another anamorphic group of lenses 46 are mounted for rotation on the optical axis of the optical system 26 in tandem with the lenses 44. A pair of pitch wedges 48 and 50 are disposed adjacent to the anamorphic group of lenses 46 and on the optical axis of the optical system 26 and produce a vertical shifting of the image passing therethrough. A decollimating lens group 52 forms the final group of lenses in the optical system 26.

If it is desired to project an image through the optical system 26 without any distortion thereto, the magnification axes of the anamorphic lenses 44 and 46 are disposed orthogonally to one another. If a one-to-one magnification is desired, the zoom lens 38 is conditioned to provide a reduction in the size of the image equal to the amount of enlargement produced by the two anamorphic lenses 44 and 46 on the image. In order to produce various effects of motion or changes in viewpoint, various elements of the optical system 26 are either translated or rotated accordingly.

In order to provide the effect of a simulated chance in heading, the projector 24 is translated laterally as indicated by the double headed arrow designated with the reference numerals 54. To provide the effect of a simulated change in the pitch of the aircraft, the pitch wedges 48 and 50 are rotated in opposite direction with respect to one another to shift the entire image vertically. To provide the effect of roll, the image rotator Pechan prism 40 is rotated.

To provide the visual effect of movement along a flightpath within the envelope 18 without any horizontal or vertical excursion, the magnification of the image is altered by means of the zoom lens 38. However, since the aircraft simulator 20 will have a simulated airspeed of approximately the airspeed of the camera airplane 14, any slight change required of the image due to a simulated change in the speed can be produced by controlling the speed of the film through the projector 24. In order to provide the visual effect of horizontal, vertical, or a combination of horizontal and vertical excursion within the envelope 18, the anamorphic lenses 44 and 46 must be rotationally positioned in accordance with a predetermined relationship described by the curves shown on FIG. 5 which will be explained below. In addition, because of rotation of the image produced by the anamorphic lenses 44 and 46, the Pechan prism 40 must be rotated to maintain all horizontal lines in the image parallel to the horizon. Since the total magnification produced by the anamorphic lenses 44 and 46 changes with the changes in position of those lenses, the zoom lens 38 must be conditioned to compensate for that change in modification.

Accordingly, the optical system illustrated in FIGS. 3 and 4 alters the apparent perspective of an image by the steps of providing two primitive transformations by means of the two anamorphic lenses, one spherical magnification by means of the zoom lens, and rotation of the image by means of the Pechan prism 40. The position of the anamorphic lens 44 is defined by the value of the angle $\beta$, which is the angle between the magnification axis of the anamorphic lens and a vertical line. The position of the anamorphic lens 46 is defined by an angle $\theta$, which is the angle between the magnification axis of the anamorphic lens 46 and the magnification axis of the lens 44.

Figure 5:
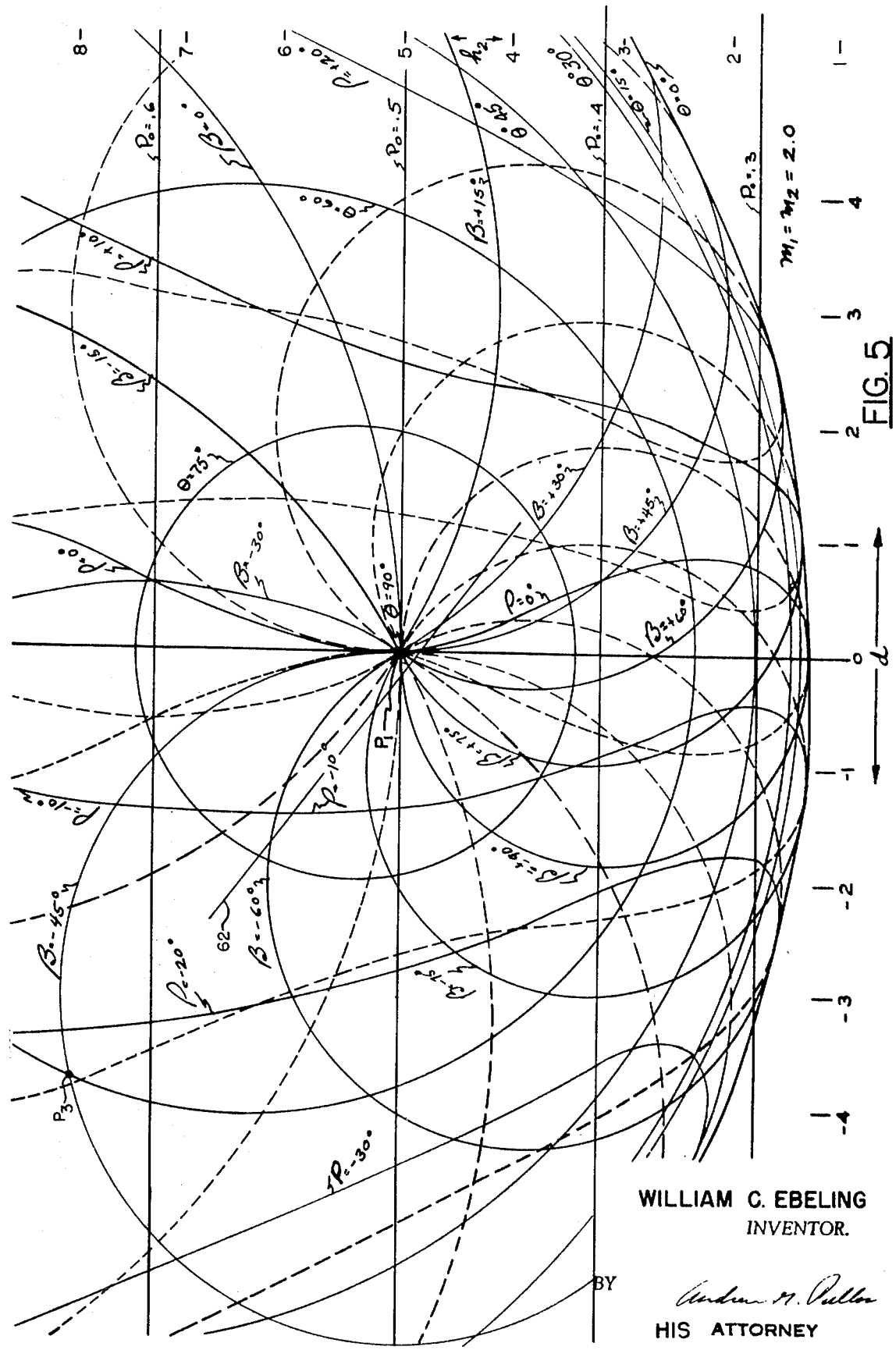
FIG. 5 is a graph of the positional relationship of several of the elements of the optical system illustrated in FIG. 3 with respect to the simulated viewpoint of an image projected by the optical system.

FIG. 5 is a graphical illustration of the values of $\beta$ and $\theta$ which will provide the change in the apparent perspective of an image transmitted through the optical system 26 illustrated in FIGS. 3 and 4. The families of curves shown in FIG. 5 are bounded by an envelope which is defined by the value of 74 equal to 0°. This envelope corresponds approximately to the envelope 18 illustrated in FIG. 1, which is the maximum possible excursion offered by the visual system in the alteration of the apparent perspective of an image. In FIG. 5, the abscissa represents a lateral displacement and the ordinate represents vertical displacement, each measured in the plane of the original viewpoint. The point $P_1$ represents the viewpoint of the undistorted image of the scenes taken from the camera airplane 14. In addition to the values of $\beta$ and $\theta$, FIG. 5 illustrates the family of curves of the rotation $\rho$ of the Pechan prism 40. The magnifications $m_1$ of the anamorphic lens 44 and $m_2$ of the anamorphic lens 46 are indicated in FIG. 5 as being equal to the value two.

Assume that an image of an area represents a scene as viewed from an original viewpoint located at an altitude of 5 units at a particular point, and that it is desired to provide an image of the area such as would be seen from a desired viewpoint at an altitude of approximately 3 units and laterally displaced from the initial viewpoint; or as shown in FIG. 5, that it is desired to alter an image taken at point $P_1$ to be in true perspective as viewed from a point $P_2$. FIG. 5 shows that the $\beta$ anamorphic lens 44 should be adjusted to a $\beta$ angle of plus 30°, the $\theta$ anamorphic lens 46 should be adjusted to a $\theta$ angle of 60°, the spherical magnification $P_0$ of the zoom lens 38 should be approximately 0.395, and that a counter rotation angle $\rho$ of the Pechan prism 40 should be approximately 10.5°. In the graph illustrated in FIG. 5, the $\beta$ family of curves represent the positions of the $\beta$ lens 44 with respect to a vertical line. However, if a rotation of the image is effected by the Pechan prism 40 prior to the transmittal of the image through the anamorphic lenses 44 and 46, the angle $\beta$ must be measured from a line which is displaced an angle $\rho$ from a vertical line. In other words, the values of the various angles and magnifications of the curves shown in FIG. 5 are true only for the situation in which the image rotator processes the image after it is processed or altered by the anamorphic lenses 44 and 46.

In considering a typical transformation of an image which would be required to simulate a visual change in perspective from the point $P_1$ to the point $P_2$ in the FIG. 5, four types of transformation are required, although it should be understood that the transformations are performed collectively.

Although the change in perspective of an image may be gradual, such changes may require high accelerations for the $\beta$ lens 44. For example, if the controls of the aircraft simulator 20 are operated in the manner to simulate a change within the envelope 18 from the point $P_2$ to a point $P_3$, the most direct excursion between those two points will follow a line on the graph in FIG. 5 which passes through or very near the point $P_1$. A segment of such a line is illustrated in FIG. 5 and designated with the reference numeral 62. During a simulated excursion along the line 62, the $\beta$ lens 44 must attain extremely high accelerations from a rotational position which is less than plus 30° to a rotational position which is equal to minus 45°. It can readily be appreciated that if an excursion is made through the point $P_1$, extremely high accelerations will be necessary in order to accurately position the $\beta$ lens 44. Since the position of the $\theta$ lens 46 is defined with respect to the position of the $\beta$ lens 44, at or near the point $P_1$, the $\theta$ lens 46 remains substantially fixed with respect to the $\beta$ lens, but the $\theta$ lens 46 must also attain the same or substantially the same acceleration as that required of the $\beta$ lens 44. At the point $P_{11}$, the position of the $\beta$ lens is undefined with respect to a reference, such as a vertical line. Consequently, the quantities which are computed from the controls of the simulator 20 to drive the $\beta$ lens 44 will be undefined at the point $P_1$ and a discontinuity will exist in such computations. Examinations of FIG. 5 at $P_1$ shows all the $\beta$ curves converging at that point. Thus $\beta$ may have any value shown and still be correct. Since it is unlikely that the viewpoint will remain exactly at $P_1$ as the simulated aircraft "flies" along, the viewpoint may wander around the area of $P_1$. Each time it wanders and passes through $P_1$ a change in $\beta$ will occur, possibly quite large. As a result, extremely high accelerations may be encountered in the positioning of the $\beta$ lens at or near the point $P_1$. However, these accelerations of the $\beta$ lens do not present any difficulties if the same accelerations can be achieved in the $\theta$ lens 46 in order to maintain the position of the $\theta$ lens fixed with respect to the $\beta$ lens at the point $P_1$. Unfortunately, the same accelerations can not be easily attained in both anamorphic lenses. Therefore, the present invention proposes the elimination of such acceleration demands on the drive systems for the lenses which are, in fact, not necessary if the positions of the lenses maintain a predetermined relationship.

Figure 6:
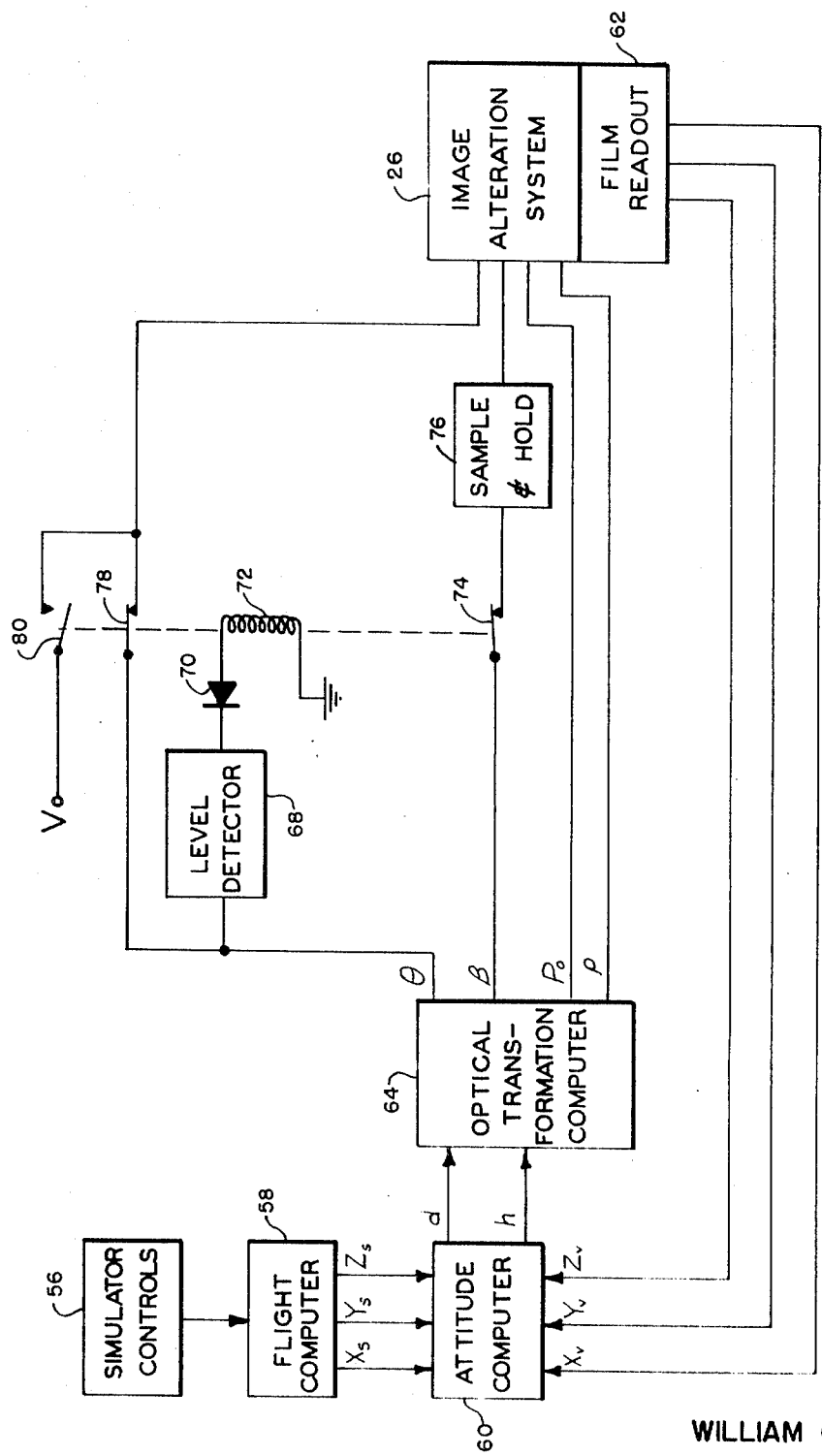
FIG. 6 is a partial schematic and partial block diagram of the computer and logic circuitry constructed in accordance with the principles of the present invention.

FIG. 6 is a partial block diagram and partial schematic diagram of the computer and logic circuitry constructed in accordance with the principles of the present invention for eliminating the unnecessary demands placed on the anamorphic drive systems. As shown therein, signals which are indicative of forces applied to the aircraft simulator 20 are supplied from controls 56 thereof to a flight computer 58 which continually computes the simulated position along the three orthogonal axes. The flight computer 58 may be any of the known prior art flight computers which are responsive to signals from the controls of a simulator to provide output signals corresponding to the simulated position along three orthogonal coordinate axes. Such a computer is disclosed by U.S. Pat. No. 2,925,667. These signals from the flight computer 58 are supplied to an attitude computer 60 which also receives signals from a film readout 62. In the preferred embodiment of the present invention, the film containing the scenes to be displayed to the operator of the simulator is provided with a soundtrack containing recorded information transfer of the data is accomplished using techniques similar to those used to transfer information from a magnetic tape recorder to a computer. Such techniques are well known in the computer art. A portion of this information relates to the position of the viewpoint of the scene recorded on the film. The position of the viewpoint of the scene recorded on the film corresponds to the position of the camera which originally exposed the film with respect to the three orthogonal coordinate axes.

The attitude computer 60 computes the quantities $d$ and $h$ (which are plotted on the abscissa and on the ordinate respectively of the graph illustrated in FIG. 5) and supplies such computed quantities to an optical transformation computer 64 which derives the quantities for positioning the elements of the optical system 26. A typical attitude computer is described in copending application entitled Visual System Computer of Kenneth Levy, Ser. No. 757,733 filed Sept. 5, 1968. The optical transformation computer 64 derives the quantities $\beta$, $\theta$, $P_o$ and $\rho$ in accordance with the equations that define the curves illustrated in FIG. 5. The optical transformation computer may be constructed using the circuits shown in U.S. Pat. No. 3,015,988. Alternatively it may be constructed by one skilled in the computer art from the information contained on FIG. 5. Outputs from the optical transformation computer 64 are employed for controlling the position of the elements in the image alteration system 26.

In accordance with the principles of the present invention, the quantities commensurate with the angular positions $\beta$ and $\theta$ are acted upon by a logic circuit before being supplied to the image alteration system 26. In the above-described image alteration system, when the value of $\theta$ is equal to 90°, the value of $\beta$ is undefined. As previously discussed, this condition causes the optical transformation computer to provide rapidly changing values for the quantity commensurate with the angular position $\beta$. The drive systems for the optical elements in the image alteration system 26 are not capable of responding to such rapidly varying values which results in undesired distortions being produced in the image presented to the operator of the simulator.

The present invention overcomes this difficulty by continuously storing the quantity commensurate with the angular position $\beta$ and supplying the value of that quantity to the image alteration system 26 which was stored immediately prior to the time when the quantity commensurate with the angular position $\theta$ exceeded a predetermined value. That is, before the quantity commensurate with the angular position $\theta$ exceeds a predetermined value, the quantity commensurate with the angular position $\beta$ is continually supplied to the image alteration system. However, when the quantity commensurate with angular position $\theta$ exceeds a predetermined value, the last stored quantity commensurate with the angular position $\beta$ is supplied to the image alteration system 26 until the quantity commensurate with the angular position $\theta$ is reduced below the predetermined value. This method of controlling the image alteration system 26 will not produce undesired distortions if the value of the constant which is compared with the quantity commensurate with the angular position $\theta$ is slightly less than the maximum value of the quantity commensurate with the angular position $\theta$. For example, if the value of the constant is equal to the value of the quantity commensurate with the angular position $\theta$ when $\theta$ is equal to 88°, any change in $\beta$ will not appreciably distort the image displayed to the operator of the simulator.

Another method of overcoming the problem is by supplying a quantity to the $\beta$ drive of the image alteration system 26 which is equal to the maximum value of the quantity commensurate with the angular position $\theta$ when the value of the quantity commensurate with the angular position $\theta$ exceeds a predetermined limit. Under such control, the $\beta$ lens can be driven to any position if the $\theta$ lens is fixed at 90° with respect to the $\beta$ lens and no distortion will be produced in the image presented to the operator of the simulator. In the preferred embodiment of the present invention, both of the above-described methods can be employed.

The logic circuitry 66 illustrated in FIG. 6 includes a level detector 68 having an input connected to the $\theta$ output of the optical transformation computer 64 and an output connected through a diode 70 and a coil of a relay 72 to ground potential. The level detector 68 senses the value of the quantity commensurate with the angular position $\theta$ at the output of the optical transformation computer 64 and actuates the relay 72 when such value exceeds a predetermined limit. In other words, the detector 68 compares the quantity commensurate with the angular position $\theta$ with a predetermined value and provides an output accordingly. The relay 72 includes a switch contact 74 which is connected between the $\beta$ output of the optical transformation computer 64 and the input of a sample and hold circuit 76. The sample and hold circuit 76 continually stores the last value of the quantity commensurate with the angular position $\beta$ supplied thereto and supplies such stored quantity to the image alteration system 26. The relay 72 also includes a normally closed switch contact 78 connected between the $\theta$ output of the optical transformation computer 64 and the image alteration system 26. The relay 72 also includes a normally open switch contact 80 connected between a source of voltage V on a terminal 82 and the image alteration system 26. The voltage V has a value equal to the maximum value of the quantity commensurate with the angular position $\theta$.

If the value of the quantity commensurate with the angular position $\theta$ does not exceed the predetermined limit established by the level detector 68, the relay 72 will remain inactive and the switch contact 74 and 78 will remain closed. Under such conditions, the values of the quantities commensurate with the angular positions $\beta$ and $\theta$ will be supplied directly to the image alteration system 26. However, when the value of the quantity commensurate with the angular position $\theta$ exceeds the predetermined limit established by the level detector 68, the relay 72 will be actuated to open each of the switch contacts 74 and 78 and to close the switch contact 80. Under such conditions, the last stored value of the quantity commensurate with the angular position $\beta$ will be continuously supplied by the sample and hold circuit 76 to the image alteration system 26 and the voltage V will be supplied to the $\theta$ drive withing the image alteration system 26 through the switch contact 80.

In the above-described image alteration system, two anamorphic lenses are employed to provide two primitive transformations to an image being presented to the operator of a simulator. The position of one of the anamorphic lenses is defined with respect to a fixed reference and the position of the other anamorphic lens is defined with respect to the position of the first anamorphic lens. Consequently, a differential is employed to control the position of the second anamorphic lens in accordance with the two variables, one of which is the position of the first anamorphic lens and the other of which is the displacement between the first anamorphic lens and the second anamorphic lens. If, as previously described, servomechanisms are employed to drive the two inputs of the differential, an error will result if relatively high rates are demanded by one of the servomechanisms, which error will be due to the inherent compliance of the other servomechanism. As a result, the second or $\theta$ anamorphic lens position will be in error until the high demands placed on the drive system for the first or $\beta$ anamorphic lens are reduced. It can be readily appreciated from the graph illustrated in FIG. 5 that an error in the position of the second or $\theta$ anamorphic lens is considerably more critical than an error in the position of the first or $\beta$ anamorphic lens in the region immediately surrounding the point $P_1$. As described hereinabove, the present invention overcomes this difficulty by anticipating the undesired condition and fixing the position of the $\beta$ lens and/or the relative position of the $\theta$ lens when the condition exists.

The principles of the present invention explain in connection with the specific exemplification thereof as described hereinabove and illustrated in the accompanying drawings will suggest many other applications and modifications of the same. It is accordingly desired that, in construing the breadth of the appended claims, they shall not be limited to the specific details shown and described in connection with the disclosed exemplification of the present invention.

1. In a system comprising first and second elements individually controllable wherein a first variable which controls said first element becomes undefined when a second variable which controls said second element is at a particular value, a method of controlling said elements in a manner which will avoid using said first variable when it is undefined comprising:
   a. comparing the value of the second variable to a constant;
   b. periodically storing the value of the first variable; and
   c. controlling the position of the second element in accordance with the value of said constant and the position of the first element in accordance with the last stored value of said first variable when the value of said second variable exceeds the value of said constant.

2. In a system comprising first and second elements individually controllable wherein a first variable which controls said first element becomes undefined when a second variable which controls said second element is at a particular value, apparatus to control said elements in a manner which will avoid using said variable when it is undefined comprising:
   a. means for comparing said second variable to a constant;
   b. means for periodically storing the value of said first variable; and
   c. means responsive to said comparing means and said storing means for controlling the position of the second element in accordance with the value of said constant and the position of the first element in accordance with the last stored value of said first variable when the value of said second variable exceeds said constant.

3. A system as defined in claim 2, further including means for supplying signals corresponding to said variables, and wherein one of the signals is connected to an input of said comparing means, said comparing means including means for connecting the other of the signals to the input of said storing means in response to a predetermined level of said one signal, which level is less than the value of said constant.

4. A system as defined in claim 3, wherein said storing means includes a sample and hold circuit and said comparing means includes a switch connected between said supplying means and said sample and hold circuit.

5. In a system comprising first and second elements individually controllable wherein a first variable which controls said first element becomes undefined when a second variable which controls said second element is at a particular value, apparatus to control said elements in a manner which will avoid using said variable when it is undefined comprising:
   a. means for comparing the value of the second variable to a constant which is substantially equal to said particular value of the second variable; and b. means responsive to said comparing means for controlling the position of said first element in accordance with a quantity which remains constant during a time period in which the value of said second variable is greater than the value of said constant.

6. A system as defined in claim 5, further including means for supplying signals corresponding to said variables and means for displacing said elements in accordance with inputs supplied thereto, said controlling means including a switch for disconnecting the signal corresponding to said second variable from one input of said displacing means and for connecting a signal of constant amplitude to said one input during said time period.

7. A system as defined in claim 6, including means for supplying signals corresponding to said variables and means for displacing said elements in accordance with inputs supplied thereto, said controlling means including means for connecting the signal corresponding to said second variable to one input of said displacing means, a sample and hold circuit connected to the other input of said displacing means, and a switch responsive to said comparing means for connecting the signal corresponding to said first variable to an input of said sample and hold circuit.

8. A system as defined in claim 7, wherein said connecting means includes a switch responsive to said comparing means for disconnecting the signal corresponding to said second variable from said one input and for connecting a signal of constant amplitude to said one input during said time period.

9. In a system comprising first and second elements individually controllable wherein a first variable which controls said first element becomes undefined when a second variable which controls said element is at its maximum value, a method of controlling said elements comprising:

a. comparing the value of the second variable to a constant; and b. controlling the position of the second element in accordance with the maximum value of said second variable and the first element in accordance with any value of the first variable when the value of said second variable exceeds the value of said constant.